Nov. 25, 1930.  W. J. PEARMAIN  1,782,880
FRICTION CLUTCH
Filed April 22, 1929
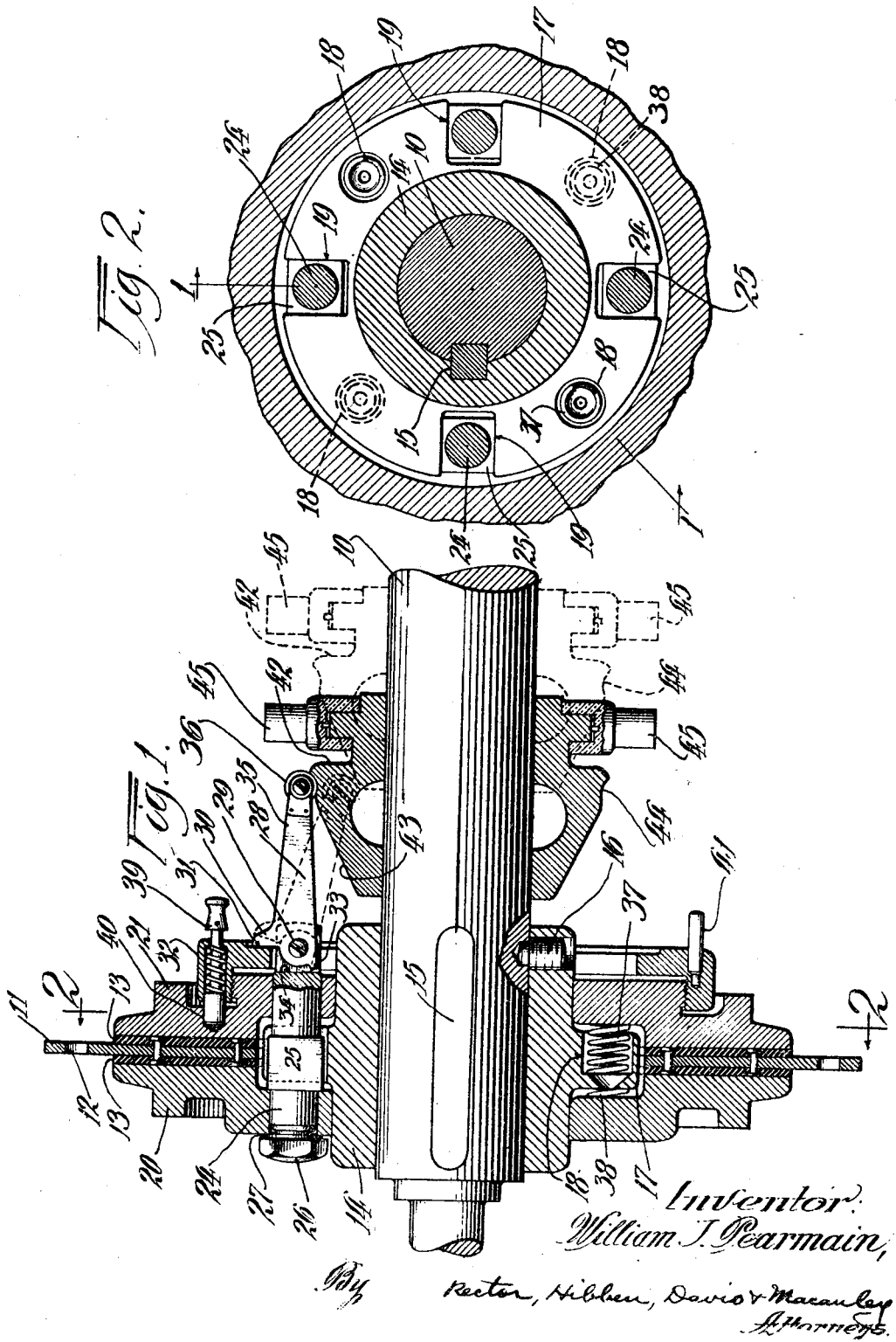

Patented Nov. 25, 1930

1,782,880

UNITED STATES PATENT OFFICE

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN

FRICTION CLUTCH

Application filed April 22, 1929. Serial No. 356,961.

My invention relates to friction clutches and more particularly to a form in which an intermediate plate is appropriately gripped between designated annular elements for effecting a transmission of power between driving and driven members. In its broader sense, it comprehends the advantages of the clutch disclosed in my United States Letters Patent No. 1,694,980, dated December 11, 1928, in respect of providing for a floating, axial movement of the annular gripping elements on the hub of the clutch, thereby permitting the hub and also the intermediate plate to be permanently fixed in position axially, as is desirable in certain constructions.

The particular improvement of the present invention resides in the means for effecting a positioning adjustment of the gripping members as the clutch plates wear, embodying briefly a form of construction in which the adjusting member is carried directly on one of the gripping members, as contrasted with its carriage on the clutch hub as disclosed in the above noted patent.

Other objects will become more apparent from the following specification, reference being had to the accompanying drawing, and the novel means by which said objects are effectuated, will be definitely pointed out in the claims.

In the drawing, Figure 1 is a sectional elevation of my improved clutch, taken generally along the line 1—1 in Fig. 2, and showing the clutch in driving position.

Fig. 2 in a section along the line 2—2 in Fig. 1.

The numeral 10 represents generically a shaft, which for purposes of illustration will be considered as the driven member and the numeral 11 a friction plate provided with a plurality of holes 12 adjacent the periphery thereof through which bolts may be applied for securing said plate to a driving member not shown. This plate will also have secured on the opposite sides thereof discs of friction material such as 13. A hub 14 is secured to the shaft 10 by means of a key 15 and may be additionally secured against axial displacement by means of a set screw 16. This hub includes a flange 17 positioned intermediate its ends and a plurality of pockets 18 which extend inwardly from one side of said flange for the reception of springs hereinafter mentioned and a similar set of pockets which extend inwardly from the opposite side of said flange for a predetermined distance for the reception of similar springs. All of said pockets are positioned at equal radial distances from the axis of the shaft 10 and those on the same side of the flange face in the same direction. This flange is further provided with a plurality of slots 19 which are cut inwardly from the periphery of the flange.

Annular gripping members 20 and 21 are mounted on the hub 14 on opposite sides of the plate 11 and driving engagement between said members and the hub 14 is effected through pins 24 which extend through said members and include square portions 25 for engagement with the sides of the slots 19. As all the driving pins are similarly formed and constructed, reference will hereinafter be made to one pin only.

One end of the pin 24 is threaded and projects beyond the member 20 for the reception of a nut 26 having a shoulder 27 which abuts against the adjacent face of said member. The opposite end of said pin extends beyond the corresponding face of the member 21 and is bifurcated to receive a lever 28 which is pivotally mounted therein by means of a pin 29. The lever 28 includes a relatively short arm 30 which cooperates with a face 31 which is recessed in a plate 32 that is threaded on the member 21 and also includes a projection 33 which functions as a stop in a manner hereinafter explained. This lever also includes a longer arm 35 which projects outwardly from the clutch and has secured on the end thereof a roller 36. Springs 37 are mounted in the pockets 18 for coaction with the adjacent inner face of the member 21 and similar springs 38 are mounted in the pockets 18 which face in the opposite direction in the flange 17 for coaction with the adjacent inner face of the member 20.

The adjusting plate 32 also carries a latch pin 39 which may be detachably inserted in a selected index hole 40 on the member 21, it being understood that there will be a plurality of such holes placed around said member. If desired, a finger gripping pin 41 may also be mounted in the plate 32 by means of which the latter may be easily moved to any indicated position. A collar 42, preferably frusto-conical in shape as indicated by the numeral 43, is slidably mounted upon the shaft 10 and includes a groove adjacent the base thereof as indicated by 44. The collar 42 may also be provided with the trunnions 45 by means of which actuation is effected through the usual shifting lever.

The operation of my improved clutch will be readily understood from the following explanation. When the collar 42 is in retracted position, as shown dotted in Fig. 1, the outward thrust of the springs 37 and 38 will cause a disengagement of the gripping members 20 and 21 from the plate 11, thereby interrupting the power flow from the driving to the driven member. Any lever 28 which may be occupying the uppermost position, as shown in Fig. 1, will be prevented from dropping under the action of gravity to a point below which the roller 36 would not engage with the surface 43, through the medium of the stop 33 which bears against the base 34 of the bifurcated end of the pin 24. It is a further function of the springs 37 and 38 to counteract the effect of the centrifugal force developed by the levers 28 when the clutch is disengaged, as will be apparent from Fig. 1.

When the collar 42 is moved to the left, the roller 36 will rise up the incline 43 thereby causing a pressure of the arm 30 against the face 31 and moving the member 21 into engagement with the friction material on the adjacent side of the plate 11. At the same time, the driving pin 24 will be thrown to the right, as shown in Fig. 1, since the fulcrum of the movement for the instant is being exercised by the end of the arm 30 thereby moving the member 20 into engagement with the friction material on the adjacent side of the plate 11, under the pressure exercised by the shoulder 27. When the collar 42 has completed its full movement toward the left, the members of the clutch will have attained full driving position and the roller 36 will then rest in the groove 44, the shape thereof being arranged to assist in maintaining the collar 42 in driving position. As the clutch facings wear, adjustment may be effected by backing off the adjusting plate 32 in order to maintain the desired position relation of the face 31 and the cooperating face of the arm 30 of the lever 28.

While I have shown one set of elements and combinations thereof for effectuating my improved friction clutch, it will be understood that the same is intended for purposes of illustration only and in no wise to restrict my arrangement to the exact forms and structures shown, for many changes may be made therein without departing from the spirit of my invention.

I claim:

1. The combination with a clutch including a friction plate and a hub adapted for attachment, respectively, to separate rotating elements and held against relative axial movement, of a pair of gripping members engageable with the opposite sides of said plate and arranged for axial movement on said hub, means connecting said members for rotatory motion with said hub, levers pivotally connected to one end of said means, a plate adjustably carried by one of said gripping members for coacting with the adjacent ends of said levers, and means for actuating said levers to force said gripping members against said friction plate.

2. The combination with a clutch including a friction plate and a hub adapted for attachment, respectively, to separate rotating elements and held against relative axial movement, of a pair of gripping members engageable with the opposite sides of said plate and arranged for axial movement on said hub, means connecting said members for rotatory motion with said hub, levers pivotally connected to one end of said means, a plate threaded on one of said gripping members for coacting with the adjacent ends of said levers, and means for actuating said levers to force said gripping members against said friction plate.

3. The combination with a clutch including a friction plate and a hub adapted for attachment, respectively, to separate rotating elements and held against relative axial movement, of a pair of gripping members engageable with opposite sides of said plate and arranged for axial movement on said hub, means connecting said members for rotatory motion with said hub, levers pivotally connected to one end of said means, a plate threaded on one of said gripping members for coacting with the adjacent ends of said levers, means for securing said threaded plate in any predetermined position, and means for actuating said levers to force said gripping members against said friction plate.

4. The combination with a clutch including a friction plate and a hub adapted for attachment, respectively, to separate rotating elements and held against relative axial movement, of a pair of gripping members engageable with the opposite sides of said plate and arranged for axial movement on said hub, driving pins engaging one of said members and connecting both of said members for rotatory motion with the hub, levers pivotally mounted on the unengaged ends of said pins, a plate adjustably carried by one of said gripping members for coacting with the adjacent ends of said levers, and means for actuating said levers to force said gripping members against said friction plate.

5. The combination with a clutch including a friction plate and a hub comprising a flange positioned intermediate its ends adapted for attachment, respectively, to a rotating part and a shaft, and held against relative axial movement, of a pair of gripping members engageable with the opposite sides of said plate and arranged for axial movement on said hub, springs interposed between the respective gripping members and said flange, driving pins engaging one of said members and connecting both of said members for rotatory motion with said hub, levers pivotally mounted on the unengaged ends of said pins, a plate carried by one of said gripping members for coacting with the adjacent ends of said levers, and a cone-shaped collar including a groove adjacent the base thereof slidable on said shaft for actuating said levers to force said gripping members against said friction plate, the ends of said levers being releasably engaged in said groove when said collar is in the actuating position.

6. The combination with a clutch including a friction plate and a hub comprising a flange positioned intermediate its ends and adapted for attachment, respectively, to a rotating part and a shaft, and held against relative axial movement, of a pair of gripping members engageable with the opposite sides of said plate and arranged for axial movement on said hub, springs interposed between the respective gripping members and said flange, driving pins engaging one of said members and connecting both of said members for rotatory motion with said hub, levers pivotally mounted on the unengaged ends of said pins, a plate carried by one of said gripping members for coacting with the adjacent ends of said levers, a cone-shaped collar including a groove adjacent the base thereof slidable on said shaft for actuating said levers to force said gripping members against said friction plate, the ends of said levers being releasably engaged in said groove when said collar is in the actuating position, and means for limiting the downward movement of the outer arms of said levers when said collar is in the released position.

7. The combination with a clutch including a friction plate and a hub comprising a flange positioned intermediate its ends and adapted for attachment, respectively, to a rotating part and a shaft, and held against relative axial movement, of a pair of gripping members engageable with the opposite sides of said plate and arranged for axial movement on said hub, springs interposed between the respective gripping members and said flange, driving pins engaging one of said members and connecting both of said members for rotatory motion with said hub, levers pivotally mounted on the unengaged ends of said pins, a plate carried by one of said gripping members for coacting with the adjacent ends of said levers, a cone-shaped collar slidable on said shaft for actuating said levers to force said gripping members against said friction plate and means for limiting the downward movement of the outer arms of said levers when said collar is in the released position.

8. The combination with a clutch including a friction plate and a hub adapted for attachment, respectively, to separate rotating elements and held against relative axial movement, of a pair of gripping members engageable with the opposite sides of said plate and arranged for axial movement on said hub, driving pins extending through both of said members for engagement with one thereof and connecting both of said members for rotatory motion with the hub, levers pivotally mounted on the unengaged ends of said pins, a plate adjustably carried by one of said gripping members for coacting with the adjacent ends of said levers, and means for actuating said levers to force said gripping members against said friction plate.

9. The combination with a clutch including a friction plate and a hub comprising a flange positioned intermediate its ends and adapted for attachment, respectively, to a rotating part and a shaft and held against relative axial movement, of a pair of gripping members engageable with the opposite sides of said plate and arranged for axial movement on said hub, springs interposed between the respective gripping members and said flange, means connecting said members for rotatory motion with said hub, levers pivotally mounted on said means, a plate carried by one of said gripping members for coacting with the adjacent ends of said levers, means on said shaft for actuating said levers to force said gripping members against said friction plate, and means for limiting the downward movement of the outer arms of said levers when said actuating means is in the released position.

10. The combination with a clutch including a friction plate and a hub adapted for attachment, respectively, to separate rotating elements and held against relative axial movement, of a pair of gripping members engageable with opposite sides of said plate and arranged for axial movement on said hub, means connecting said members for rotatory motion with said hub, levers pivotally connected to said means, a plate carried by one of said gripping members for coacting with the adjacent ends of said levers, means for actuating said levers to force said gripping members against said friction plate, and means for limiting the downward movement of the outer arms of said levers when said actuating means is in the released position.

In testimony whereof, I have subscribed my name.

WILLIAM J. PEARMAIN.